(12) United States Patent
Rajagopalan et al.

(10) Patent No.: US 11,757,722 B2
(45) Date of Patent: *Sep. 12, 2023

(54) AUTOMATIC SWITCHING FABRIC ROLE DETERMINATION SYSTEM

(71) Applicant: Dell Products L.P., Round Rock, TX (US)

(72) Inventors: Balaji Rajagopalan, Sunnyvale, CA (US); Charles Chul Hyun Park, San Jose, CA (US); Joseph LaSalle White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/378,343

(22) Filed: Jul. 16, 2021

(65) Prior Publication Data
US 2021/0344568 A1    Nov. 4, 2021

Related U.S. Application Data

(63) Continuation of application No. 16/265,495, filed on Feb. 1, 2019, now Pat. No. 11,108,641.

(51) Int. Cl.
*H04L 12/24*    (2006.01)
*H04L 41/12*    (2022.01)
*H04L 41/0893*    (2022.01)

(52) U.S. Cl.
CPC .......... *H04L 41/12* (2013.01); *H04L 41/0893* (2013.01)

(58) Field of Classification Search
CPC ..... Y02D 30/00; H04L 49/35; H04L 41/0893; H04L 41/12
See application file for complete search history.

(56) References Cited

U.S. PATENT DOCUMENTS

| | | | |
|---|---|---|---|
| 7,380,025 B1* | 5/2008 | Riggins | H04L 41/12 710/10 |
| 9,077,580 B1 | 7/2015 | Randhawa et al. | |
| 9,832,111 B2* | 11/2017 | Zhou | H04L 45/38 |
| 2014/0067983 A1* | 3/2014 | Gabriel | H04L 49/356 709/208 |
| 2014/0371880 A1* | 12/2014 | Lee | H04L 41/042 700/20 |
| 2019/0068401 A1* | 2/2019 | Johnsen | H04L 12/462 |
| 2019/0080254 A1* | 3/2019 | Haah | H04L 9/0858 |
| 2019/0158356 A1* | 5/2019 | Dasu | H04L 69/324 |
| 2019/0230026 A1* | 7/2019 | Jailani | H04L 41/0213 |

\* cited by examiner

*Primary Examiner* — Abdullahi E Salad
(74) *Attorney, Agent, or Firm* — Joseph Mencher

(57) ABSTRACT

A switching fabric role assignment system includes a plurality of switch devices coupled together in a switching fabric. A first switch device included in the plurality of switch devices receives an endhost device identification communication from an endhost device when the endhost device is connected to the first switch device. The first switch device uses the endhost device identification communication to identify an endhost device type of the endhost device and determines, based on the endhost device type, a first switch device role for the first switch device. The first switch device then transmits a first switch device role communication that identifies the first switch device role to a second switch device included in the plurality of switch devices and connected to the first switch device. The second switch device may then determine, based on the first switch device role, a second switch device role for the second switch device.

20 Claims, 14 Drawing Sheets

AUTOMATIC SWITCHING FABRIC ROLE DETERMINATION SYSTEM

CROSS-REFERENCE TO RELATED APPLICATIONS

The present disclosure is a continuation of U.S. patent application Ser. No. 16/265,495, filed on Feb. 1, 2019, the disclosure of which is incorporated by reference herein in its entirety.

BACKGROUND

The present disclosure relates generally to information handling systems, and more particularly to automatically determining roles for information handling systems provided in a switching fabric.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are often configured to provide switching fabrics. However, the configuration and management of conventional switching fabrics is associated with complexity, ongoing operational overhead, and relatively long times required for new system deployment. Software Defined Networking (SDN) techniques have been developed to alleviate some of the management and control issues associated with conventional switching fabrics, but are still associated with complex configuration operations and relatively long configuration times. In addition, such techniques require a device external to the switching fabric (e.g., a server device upon which an SDN controller operates in order to manage and control SDN switch devices in the switching fabric) in order to provide for management and control of the switching fabric, which increases the cost of managing and controlling the switching fabric. As such, conventional switching fabric configuration techniques increase the overhead associated with performing management and control operations on switch devices in that switching fabric including, for example, the assignment of switch device roles to the switch devices that provide the switching fabric.

Accordingly, it would be desirable to provide an improved switching fabric that provides for automated role determination for the switch devices that provide the switching fabric.

SUMMARY

According to one embodiment, an Information Handling System (IHS) includes a communication system; a processing system that is coupled to the communication system; and a memory system that is coupled to the processing system and that includes instructions that, when executed by the processing system, cause the processing system to provide a switching fabric role determination engine that is configured to: receive, following a connection of an endhost device to the communication system, an endhost device identification communication; identify, using the endhost device identification communication, an endhost device type of the endhost device; determine, based on the endhost device type of the endhost device that was connected to the communication system, a first switch device role for the IHS; and transmit, to at least one switch device that is connected to the communication system, a first switch device role communication that identifies the first switch device role.

BRIEF DESCRIPTION OF THE DRAWINGS

FIG. 100 is a schematic view illustrating an embodiment of communications in the automatic switching fabric role assignment system of FIG. 7 during the method of FIG. 9.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
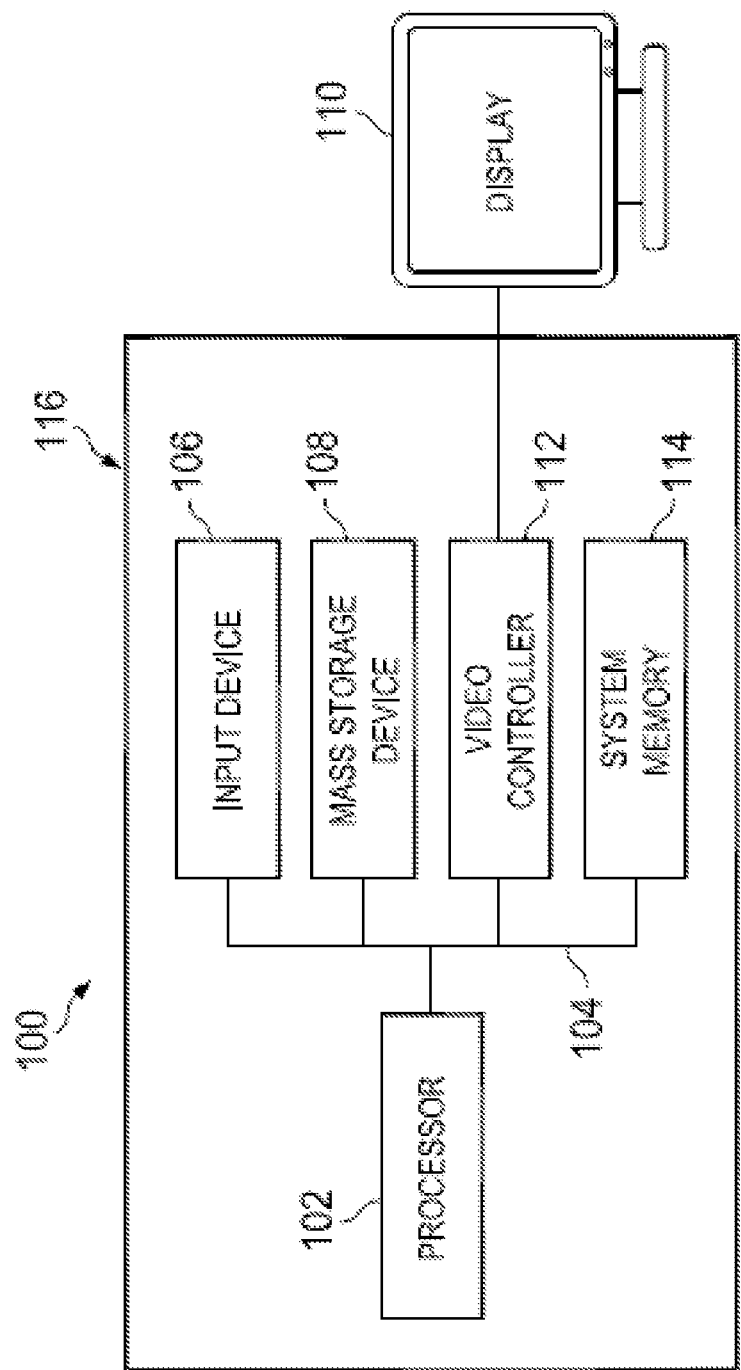
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
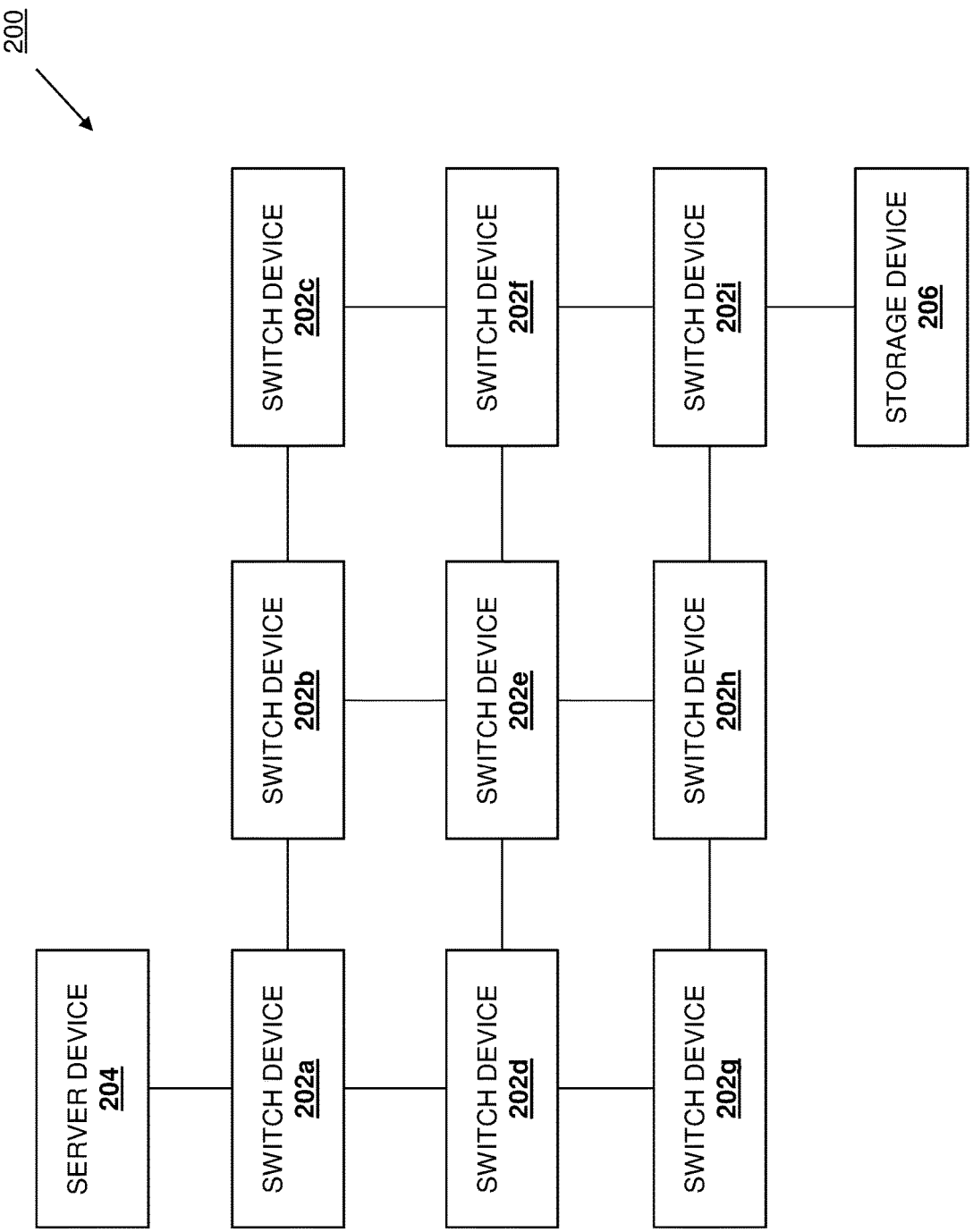
FIG. 2 is a schematic view illustrating an embodiment of a switching fabric configuration and management system.

Referring now to FIG. 2, an embodiment of a switching fabric configuration and management system 200 is illustrated. In the illustrated embodiment, the switching fabric configuration and management system 200 incudes a plurality of networking devices such as, for example, the switch devices 202*a*, 202*b*, 202*c*, 202*d*, 202*e*, 202*f*, 202*g*, 202*h*, and 202*i*, illustrated in FIG. 2. In an embodiment, any or all of the switch devices 202*a*-*i* may be provided by the IHS 100 discussed above with reference to FIG. 1, and/or may include some or all of the components of the IHS 100. However, while illustrated and discussed as switch devices, one of skill in the art in possession of the present disclosure will recognize that a variety of networking devices may provide in the switching fabric configuration and management system 200 of the present disclosure, and any devices that may be configured to operate in a fabric similarly as discussed for the switching fabric described below may benefit from the teachings of the present disclosure as well. As would be understood by one of skill in the art in possession of the present disclosure, any of the switch devices 202*a*-*i* may be coupled to endhost device(s). For example, in the illustrated embodiment, the switch device 202*a* is coupled to an endhost device provided by a server device 204, and the switch device 202*i* is coupled to an endhost device provided by a storage device 206. Each of the server device 204 and storage device 206 may be provided by the IHS 100 discussed above with reference to FIG. 1, and/or may include some or all of the components of the IHS 100. However, one of skill in the art in possession of the present disclosure will recognize that many more endhost devices may (and typically will) be coupled to any of the switch devices 202*a*-*i* (e.g., an a datacenter) while remaining within the scope of the present disclosure, and may be provided by a variety of compute/storage nodes known in the art. Furthermore, management devices and/or other devices may be provided as endhost devices while remaining within the scope of the present disclosure as well. While a specific switching fabric configuration and management system 200 has been illustrated and described, one of skill in the art in possession of the present disclosure will recognize that the switching fabric configuration and management system of the present disclosure may include a variety of components and component configurations while remaining within the scope of the present disclosure as well.

Figure 3:
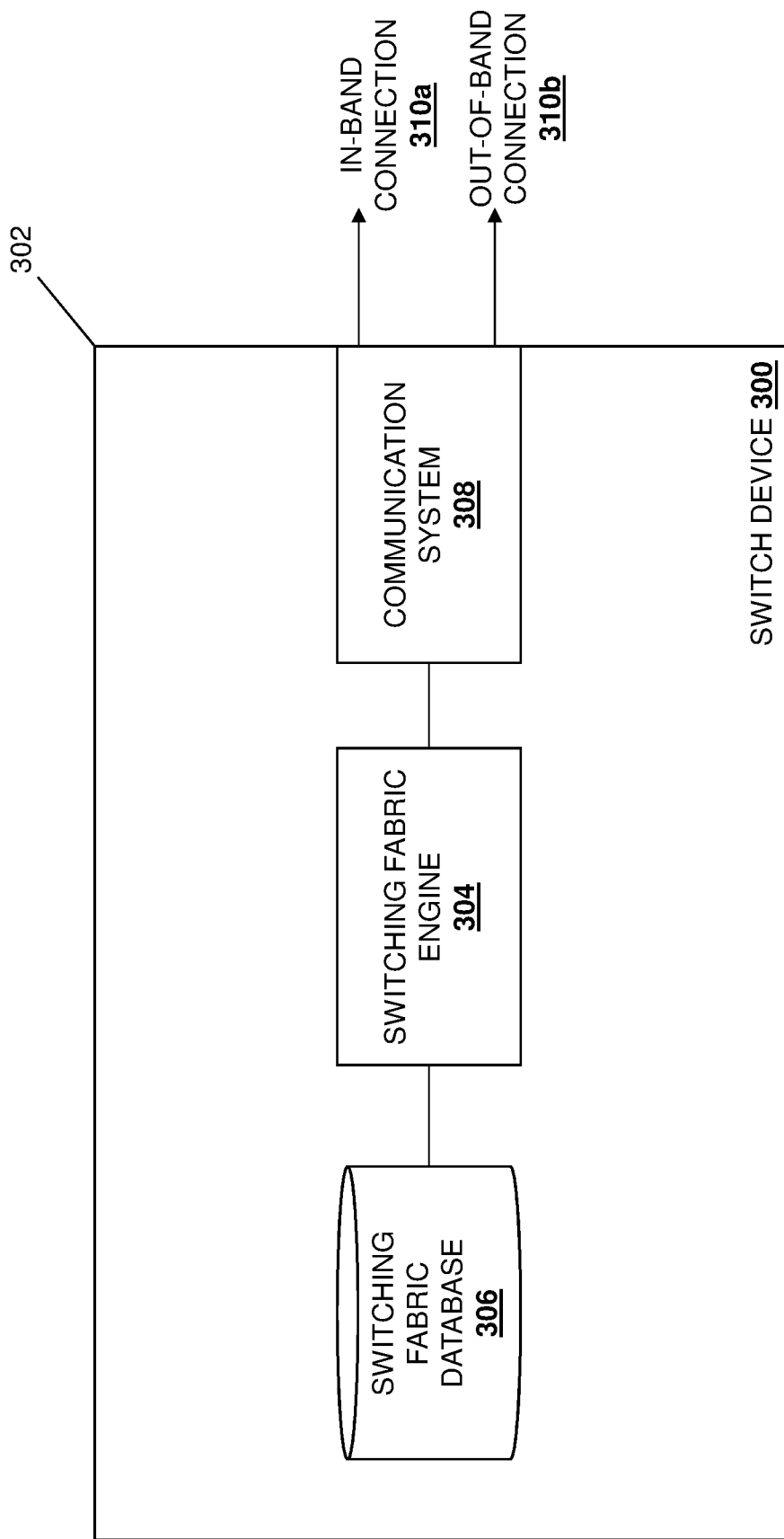
FIG. 3 is a schematic view illustrating an embodiment of a switch device that may be provided in the switching fabric configuration and management system of FIG. 2.

Referring now to FIG. 3, an embodiment of a switch device 300 is illustrated that may provide any or all of the switch devices 202*a*-*i* discussed above with reference to FIG. 2. As such, the switch device 300 may be provided by the IHS 100 discussed above with reference to FIG. 1 and/or may include some or all of the components of the IHS 100. Furthermore, while illustrated and discussed as a switch device, one of skill in the art in possession of the present disclosure will recognize that the functionality of the switch device 300 discussed below may be provided by other networking devices and/or other devices that are configured to operate in a fabric similarly as discussed for the switching fabric described below. In the illustrated embodiment, the switch device 300 includes a chassis 302 that houses the components of the switch device 300, only some of which are illustrated below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switching fabric engine 304 that is configured to perform the functionality of the switching fabric engines and/or switch devices discussed below. In a specific example, the switching fabric engine 304 may be provided, at least in part, by a Central Processing Unit (CPU) in the switch device 300 that is separate from a Network Processing Unit (NPU) in the switch device 300 that performs conventional switch device functions (e.g., data path determination and data path forwarding), and that may be included in instructions on the memory system that, when executed by the CPU, cause the CPU to provide the DELL® Operating System 10 (OS10) available from DELL® Inc., of Round Rock, Tex., United States, configures the NPU to perform the switch device functions, and/or performs a variety of other CPU functionality known in the art. Furthermore, at least some of the functionality of the switching fabric engine 304 may be provided by agent(s) included on the switch device 300.

The chassis 302 may also house a storage system (not illustrated, but which may include the storage 108 discussed above with reference to FIG. 1) that is coupled to the switching fabric engine 304 (e.g., via a coupling between the storage system and the processing system) and that includes a switching fabric database 306 that is configured to store any of the information utilized by the switching fabric engine 304 discussed below. The chassis 302 may also house a communication system 308 that is coupled to the switching fabric engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As can be seen, the communication system 308 may provide either or both of an in-band connection 310a and an out-of-band connection 310b to, for example, the other switch devices, endhosts, management devices, and/or any other device that would be apparent to one of skill in the art in possession of the present disclosure. While a specific switch device 300 has been illustrated and described, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
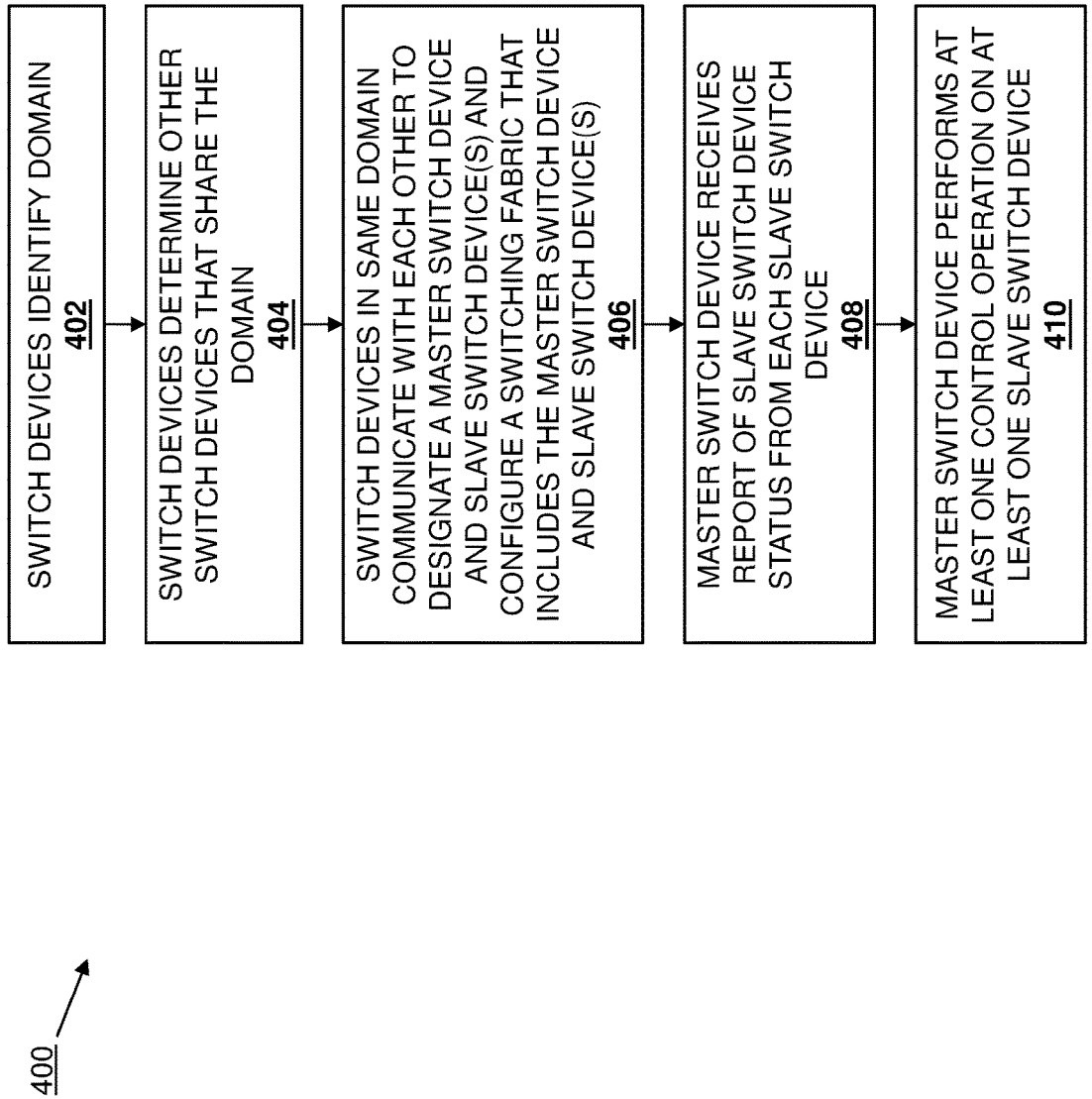
FIG. 4 is a flow chart illustrating an embodiment of a method for configuring and managing a switching fabric.

Referring now to FIG. 4, an embodiment of a method for configuring and managing a switching fabric is illustrated. As discussed below, the systems and methods of the present disclosure provide for the configuration of switching fabrics in a manner that reduces the complexity, ongoing operational overhead, and relatively long times required for new system deployment, as well as eliminates the need for to provide a device external to the switching fabric that performs the management and control functionality for the switching fabric, thus reducing the cost of managing and controlling the switching fabric. For example, the switching fabrics provided via the teachings of the present disclosure may only require a plurality of switch devices that operate to configure themselves into a switching fabric via communications that result in those devices discovering each other and forming a switch device cluster, and then electing one of those switch devices as a master switch device for the switch device cluster/switching fabric and the remaining switch devices as slave switch devices in the switch device cluster/switching fabric. Following the configuration of the switching fabric, the master switch device may perform control/management operations on any of the slave switch devices. Furthermore, the master switch device may share its master switch device configuration with each of the slave switch devices, which allows any of those slave switch devices to configure themselves as a master switch device in the event the switch device that is operating as the master switch device becomes unavailable. As such, in some embodiments, switching fabrics may be configured and managed without the need for an external device with a Central Processing Units (CPU), and may instead be configured and managed using the CPU in the switch devices that make up the switching fabric.

The method 400 begins at block 402 where switch devices identify a domain. In an embodiment, at or prior to block 402, each switch device that is to-be utilized to provide the switching fabric according to the teachings of the present disclosure may be provided a common domain identifier that identifies a common domain for those switch devices. For example, with reference to FIG. 2 and the examples provided below, each of the switch devices 202a-i are utilized to provide the switching fabric according to the teachings of the present disclosure, and a common domain identifier may be provided in the switching fabric database 306 included in each of those switch devices 202a-i/300. For example, a network administrator or other user of the switch devices 202a-i may provide the common domain identifier in the switching fabric database 306 of each of the switch devices 202a-i/300 in order to configure those switch devices 202a-i/300 for the switching fabric discussed below. However, while the use of a domain identifier in configuring the switching fabric of the present disclosure is described below, one of skill in the art in possession of the present disclosure will recognize that other switch device personality information (e.g., DELL® OS10 personality information) may be utilized to configure the switching fabric in manner similar to that described for the domain identifier below while remaining within the scope of the present disclosure as well.

As such, in some specific examples, the network administrator or other user may cable a management device to each switch device 300 (e.g., via a management port on the communication system 308), and use an input subsystem on the management device to log into each switch device 300 and provide the domain identifier to the switching fabric engine 304 for storage in the switching fabric database 306. However, in other specific examples, the network administrator or other user may use a management device to access each switch device 300 via a management network that is coupled to the communication system 308, and log into each switch device 300 to provide the domain identifier to the switching fabric engine 304 in each switch device 202a-i/300 for storage in the switching fabric database 306. While a few specific examples have been described, one of skill in the art in possession of the present disclosure will recognize that the common domain identifier may be provided in the switching fabric database 306 of each of the switch devices 202a-i/300 in a variety of manners that will fall within the scope of the present disclosure as well.

At block 402, the switching fabric engine 304 in each switch device 202a-i/300 may operate to access its switching fabric database 306 and identify the domain identifier stored therein. For example, at or prior to block 402, a network administrator or other user may couple together each of the switch devices 202a-i (e.g., via a variety of cabling and coupling techniques that would be apparent to one of skill in the art in possession of the present disclosure) and/or provide each of the switch devices 202a-i as part of a Local Area Network (LAN). Following the coupling together of the switch devices 202a-i, each of those switch devices 202a-i may be powered on, booted, and/or otherwise initialized and, in response, the switching fabric engine 304 in each switch device 202a-i/300 may operate to access its switching fabric database 306 and identify the domain identifier that was provided as discussed above. However, while a specific example has been described, one of skill in the art in possession of the present disclosure will recognize that a switch device may identify a domain identifier (and a corresponding domain in which that switch device belongs) in a variety of manners that will fall within the scope of the present disclosure as well. As such, following block 402, each switch device 202a-i may have identified the domain to which it belongs, as per an assignment by a network administrator or other user of a common domain to each switch device that is to provide the switching fabric of the present disclosure.

The method 400 then proceeds to block 404 where the switch devices determine other switch devices that share the domain. In an embodiment, at block 404, the switching fabric engine 304 in each switch device 202a-i/300 may operate to transmit its domain identifier that was identified at block 402 to at least some of the other switch devices 202a-i/300. As discussed above, the switch devices 202a-i/300 may be part of a LAN, and the switching fabric engine 304 in each switch device 202a-i/300 may transmit its domain identifier over a Virtual LAN (VLAN) provided on that LAN. As such, at block 404 the switch devices 202a-i/300 may exchange their domain identifiers, and the switching fabric engine 304 in each switch device 202a-i/300 may operate to determine the switch devices that share its domain when it receives a domain identifier from those switch devices that matches its domain identifier. While the exchange of domain identifiers between switch devices to allow each of those switch devices to determine that they share a domain with the other switch devices has been described, one of skill in the art in possession of the present disclosure will recognize that switch devices may determine that they share a domain using a variety of techniques that will fall within the scope of the present disclosure as well.

The method 400 then proceeds to block 406 where the switch devices in the same domain communicate with each other to designate a master switch device and slave switch devices, and configure a switching fabric that includes the master switch device and the slave switch device. In an embodiment, at block 406, the switching fabric engine 304 in each switch device 202a-i/300 that was determined to share a domain at block 404 may operate to communicate with each other to designate a master switch device and slave switch devices. For example, the switching fabric engine 304 in each switch device 202a-i/300 that was determined to share a domain at block 404 may communicate using the Virtual Router Redundancy Protocol (VRRP) in order to designate the master switch device and slave switch devices at block 406. One of skill in the art in possession of the present disclosure will recognize that the VRRP is a computer networking protocol that is conventionally used to provide for the automatic assignment of available Internet Protocol (IP) router devices to participating host devices in order to increase the availability and reliability of routing paths via automatic default gateway selections on an IP network, and operates to create virtual router devices (e.g., abstractions of multiple router devices) that include a master router device and slave/backup router devices that operate as a group.

As such, one of skill in the art in possession of the present disclosure will recognize how the switching fabric engine 304 in each switch device 202a-i/300 that was determined to share a domain at block 404 may communicate using the VRRP in order to designate a master switch device and slave switch devices. For example, the communications between the switching fabric engine 304 in each switch device 202a-i/300 using the VRRP in order to designate a master switch device and slave switch devices may include the exchange of IP addresses and the election of the switch device having the lowest IP address as the master switch device, which results in the remaining switch devices being designated as slave switch devices. In some embodiments, the designation of the master switch device may include that master switch device being assigned a unique master switch device IP address that, as discussed below, may be utilized by the slave switch devices to communicate with the master switch device.

Figure 5:
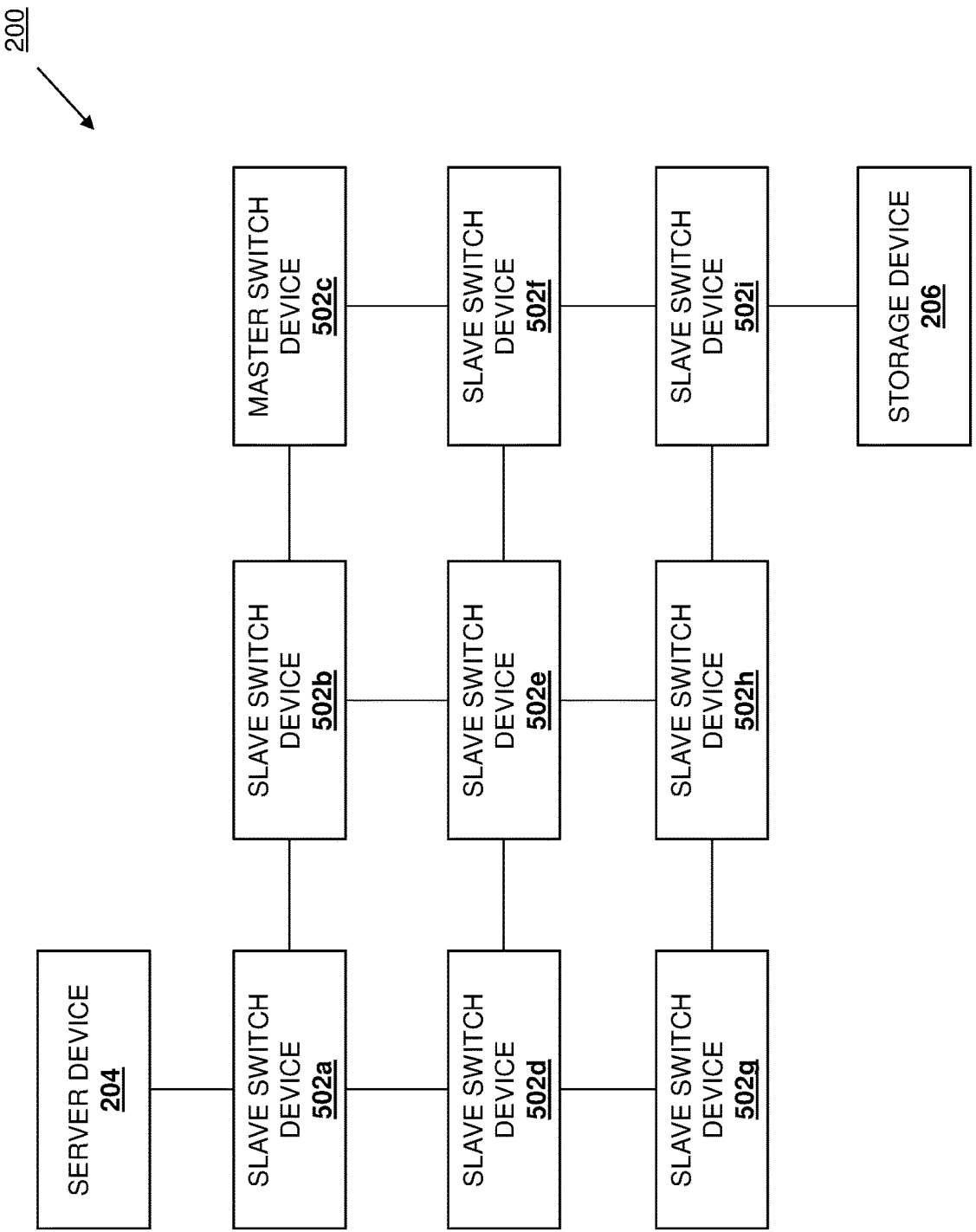
FIG. 5 is a schematic view illustrating an embodiment of the switching fabric switching fabric configuration and management system of FIG. 2 during the method of FIG. 4.

With reference to FIG. 5, an embodiment of the switching fabric configuration and management system 200 discussed above with reference to FIG. 2 is illustrated following the designation of the master switch device and the slave switch devices at block 406. For example, in the embodiment illustrated in FIG. 5 and with reference to FIG. 2, the switch device 202c has been designated as a master switch device 502c, while the switch devices 202a, 202b, and 202d-i have been designated as slave switch devices 502a, 502b, and 502d-i, respectively. In a specific example, at block 406, at least some of the functionality of the switching fabric engine 304 in each switch device 202a-i/300 that allows for the designation of the master switch device and slave switch devices at block 406 may be provided by Keepalived routing software, available from www.keepalived.org, which one of skill in the art in possession of the present disclosure will recognize uses the VRRP. However, while a specific software and protocol has been discussed as being used to designate the master switch device and slave switch devices of the present disclosure, one of skill in the art in possession of the present disclosure will recognize that the master switch device and slave switch devices may be designated in a variety of manners that will fall within the scope of the present disclosure as well.

Figure 6:
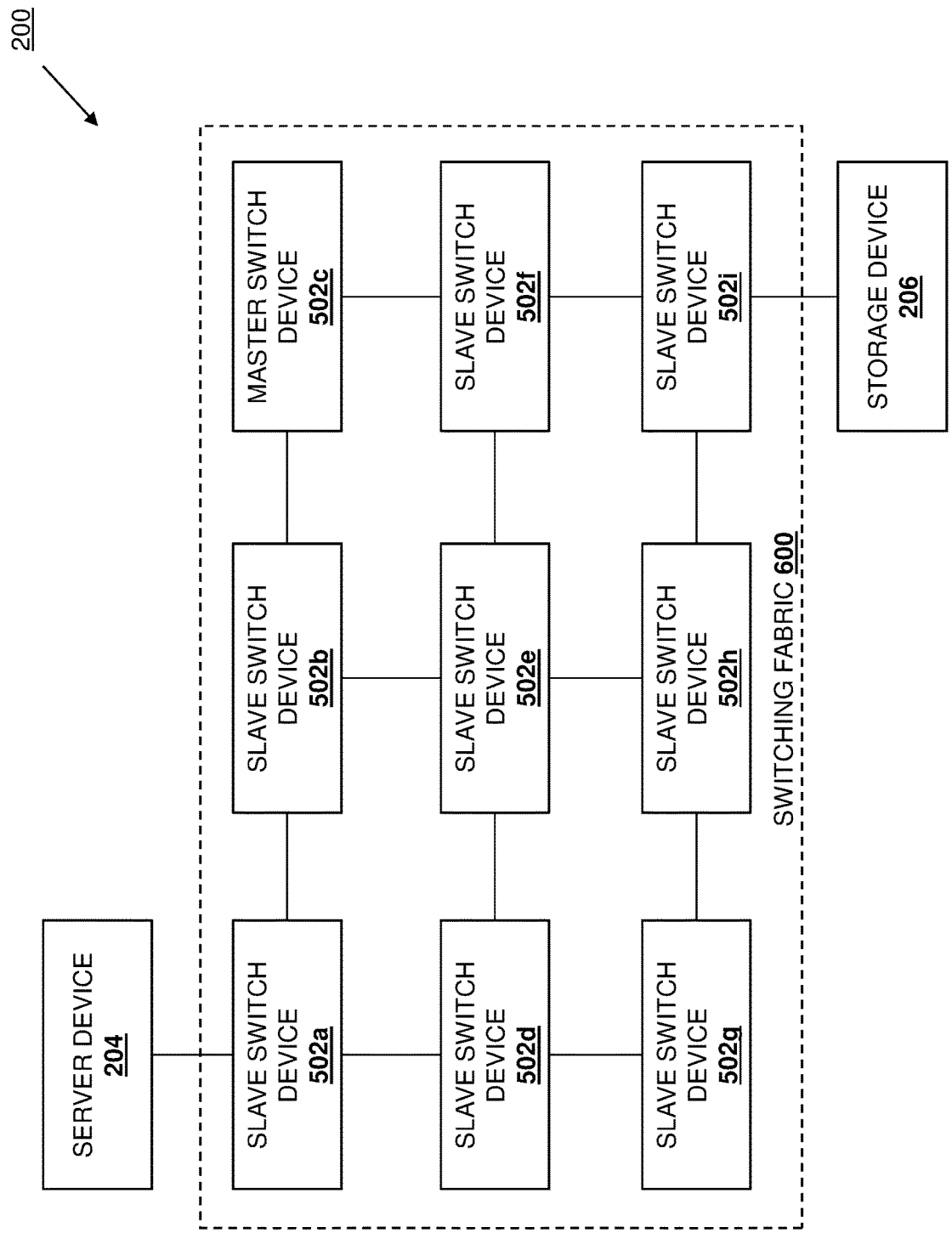
FIG. 6 is a schematic view illustrating an embodiment of the switching fabric switching fabric configuration and management system of FIG. 2 during the method of FIG. 4.

The method 400 then proceeds to block 408 where the master switch device receives a report of a slave switch device status from each slave switch device. In an embodiment, at block 408, the switching fabric engine 304 in each switch device 502a/300, 502b/300, and 502d-i/300 may operate to report its slave switch device status by, for example, generating a slave switch device status report that is directed to the unique master switch device IP address that was assigned to the master switch device 502c as discussed above, and transmitting the slave switch device status report to that unique master switch device IP address. As such, at block 408, the switching fabric engine 304 in the master switch device 502c receives the slave switch device status report from each of the slave switch devices 502a, 502b, and 502d-i. As illustrated in FIG. 6, and as would be understood by one of skill in the art in possession of the present disclosure, the designation of the master switch device 502c and the slave switch devices 502a, 502b, and 502d-i, along with the reporting of the slave switch device status by each of the slave switch devices 502a, 502b, and 502d-i to the master switch device 502c, allows for the configuration of a switch device cluster by the master switch device 502c that provides a switching fabric 600 that includes that master switch device 502c and those slave switch devices 502a, 502b, and 502d-l, and may include a variety of other operations by the master switch device 502c that provides for the configuration of the switching fabric 600 based on any of a variety of switching fabric policies that would be apparent to one of skill in the art in possession of the present disclosure.

The method 400 then proceeds to block 410 where the master switch device performs at least one control operation on at least one slave switch device. In an embodiment, at block 410 and following the configuration of the switch device cluster that provides the switching fabric 600, the master switch device 502c and the slave switch devices 502a, 502b, and 502d-i may interact in a variety of manners that provides for the management and control of the switch device cluster that provides the switching fabric 600. For example, one of skill in the art in possession of the present disclosure will recognize the master switch device 502c and the slave switch devices 502a, 502b, and 502d-i provided according to the teachings of the present disclosure may synchronize their states using a distributed object model in order to maintain the switch device cluster that provides the switching fabric 600.

In some embodiments, the communications between the master switch device 502c and the slave switch devices 502a, 502b, and 502d-i may be enabled by each switching fabric engine 304 in each of the master switch device 502c/300 and the slave switch devices 502a/300, 502b/300, and 502d-i/300 performing publish/subscribe (pub/sub) operations, which one of skill in the art in possession of the present disclosure will recognize provides a messaging pattern where senders of messages (called publishers) do not program the messages to be sent directly to specific receivers (called subscribers), but instead categorize published messages into classes without knowledge of which subscribers there may be, while subscribers express interest in one or more classes and only receive messages that are of interest, without knowledge of which publishers there are. In a specific example, the pub/sub operations utilized by the master switch device 502c and the slave switch devices 502a, 502b, and 502d-i may be achieved via a conjunction of Control Plane Services (CPS) available in the DELL® OS10 discussed above, and REmote Dictionary Server (REDIS), which is an open-source in-memory data structure project that implements a distributed, in-memory, key-value database with optional durability.

In some embodiments, the master switch device 502c and the slave switch devices 502a, 502b, and 502d-i may perform database sharing in order to share some or all of the contents of their respective switching fabric databases 306, which may be achieved via a conjunction of CPS, REDIS, and application level client synchronization. In a specific example, the master switch device 502c and the slave switch devices 502a, 502b, and 502d-i may perform the pub/sub operations discussed above, along with the utilization of synchronization applications, in order to provide for the sharing of a master switch device configuration file that describes the configuration of the master switch device 502c. For example, the switching fabric engine 304 in the master switch device 502c/300 may retrieve a master switch device configuration file that is stored in its switching fabric database 306, and publish that master switch device configuration file through the communication system 308 for retrieval by each of the slave switch devices 502a, 502b, and 502d-i. As such, the switching fabric engine 304 in each slave switch devices 502a, 502b, and 502d-i may retrieve that master switch device configuration file via its communication system 308 (e.g., via the subscriptions discussed above), and store that master switch device configuration file in its switching fabric database 306. (e.g., "replicating" the master switch device configuration file on each of the slave switch devices 502a, 502b, and 502d-i).

The master switch device configuration file sharing/replication allows for any of the slave switch devices 502a, 502b, and 502d-i to take over in the event the master switch device 502c become unavailable. For example, the switching fabric engine 304 in each slave switch devices 502a, 502b, and 502d-i may be configured to determine that the master switch device 502c (a primary master switch device in this example) is unavailable (e.g., in response to failing to receive regular communications and/or responses from the master switch device 502c) and, in response, retrieve the master switch device configuration file replicated in its switching fabric database 306 as discussed above, and use that master switch device configuration file to configure itself as a master switch device (e.g., a secondary master switch device in this example) that is capable of performing all of the management/control functionality available from the primary master switch device The determination of which of the slave switch devices 502a, 502b, and 502d-i will take over for an unavailable master switch device may be made based on, for example, the slave switch device with the lowest IP address, keepalived/VRRP master election schemes, and/or a variety of other criteria that would be apparent to one of skill in the art in possession of the present disclosure.

In some embodiments, the switching fabric engine 304 in the master switch device 502c may utilize either or both of the in-band connection 310a and the out-of-band connection 310b provided by its communication system 308 in order to provide for management access and internal operations. For example, the master switch device 502c may be the only switch device in the switch device cluster that provides the switching fabric 600 that is exposed to external management entities such as the server device 204 and storage device 206. The exposure of the master switch device 502c may be enabled by the switching fabric engine 304 in the master switch device 502c exposing a REpresentational State Transfer (REST) Application Programming Interface (API) that allows external entities to access management functionality in the master switch device 502c, which allows control/management/monitoring functionality performed by the master switch device 502c at block 410 to be controlled by an management device. As such, the master switch device 502c may provide a single management "touch point" for the switching fabric 600 using a REST model that may allow in-band or out-of-band management access via, for example, a virtual IP (vIP) address assigned to the master switch device 502c (i.e., a master vIP), and/or physical IP addresses (e.g., IPv6 addresses) assigned to the master switch device 502c and slave switch devices 502a, 502b, and 502d-i. As will be appreciated by one of skill in the art in possession of the present disclosure, the structure of the REST model allows the master switch device 502c to capture the core relationships among the elements in the switching fabric 600.

In some embodiments, the switching fabric engine 304 in the master switch device 502c may maintain the liveliness of each of the slave switch devices 502a, 502b, and 502d-i in order to, for example, enable the determination of when any of the slave switch devices 502a, 502b, and 502d-i become unavailable. Similarly, the switching fabric engine 304 in each of the slave switch devices 502a, 502b, and 502d-i may maintain its own connectivity to the master switch device 502c. As such, the switching fabric engine 304 in the master switch device 502c may listen for events from each of the slave switch devices 502a, 502b, and 502d-i and respond to those events, and the switching fabric engine 304 in each of the slave switch devices 502a, 502b, and 502d-i may listen to events from the master switch device 502c and may separately respond to those events.

In some embodiments, the switch device cluster that provides the switching fabric 600 may support multiple fabrics. For example, as would be understood by one of skill in the art in possession of the present disclosure, ports on different switch devices in the switching fabric 600 may be provided as part of a Link Aggregation Group (LAG) using Virtual Link Trunking (VLT), a proprietary aggregation protocol available from DELL® Inc. of Round Rock, Tex., United States, that provides those switch devices as part of a VLT fabric (i.e., a forwarding fabric) that is supported by the switching fabric 600 (e.g., provided by a switch device cluster/management fabric).

In some embodiments, the forwarding plane provided by the switching fabric 600 does not require special vendor proprietary features from the Network Processing Unit (NPU) that is utilized to provide switching functionality in the switch devices 300. As such, the switching fabric engine 304 may be independent of the NPU (i.e., hardware independent), and may only depend on the operating system that is utilized by the switch device 300 and provided by a Central Processing Unit (CPU) in the switch device 300 that communicates with the NPU via any of a variety of interfaces that would be apparent to one of skill in the art in possession of the present disclosure. Furthermore, the functionality of the master switch device 502*c* and the slave switch devices 502*a*, 502*b*, and 502*d-i* may be enabled via a modular plug-in architecture and distributed models. In some examples, configurations via of the switch device cluster that provides the switching fabric 600 may be automated in a variety of manners including, for example, a set of policies (e.g., policies to configure server devices in a particular manner when connected to the switching fabric 600 based on, for example, a server device identifier detected in that server device upon its connection to the switching fabric 600) and/or meta data (e.g., fabric mode meta data, attached system discovery identity meta data, etc.) injection.

As such, at block 410, the switching fabric engine 304 in the master switch device 502*c* may perform any of a variety of control operation on one or more of the slave switch devices 502*a*, 502*b*, and 502*d-i* that may include, for example, configuring a Link Aggregation Group (LAG) using a plurality of ports on one or more of the slave switch devices 502*a*, 502*b*, and 502*d-i*; setting up the forwarding of data traffic on one or more of the slave switch devices 502*a*, 502*b*, and 502*d-i*; providing bindings between ports and VLANs; providing bindings between ports, LAGs, and VLANs; utilizing the Link Aggregation Control Protocol (LACP) on ports; performing physical port configurations such as Maximum Transmission Unit (MTU) configurations and auto-negotiation configurations; providing storage configurations; providing data uplink related configurations such as VLAN configurations, LACP configurations, and LAG configurations; and/or a variety of other control operations that would be apparent to one of skill in the art in possession of the present disclosure.

Thus, systems and methods have been described that provide switching fabrics using a plurality of switch devices that operate to configure themselves into a switching fabric via communications that result in those devices discovering each other and forming a switch device cluster, and then electing one of those switch devices as a master switch device for the switch device cluster/switching fabric such that the remaining switch devices are designated as slave switch devices in the switch device cluster/switching fabric. Following the configuration of the switching fabric, the master switch device may perform control operations on any of the slave switch devices. Furthermore, the master switch device may share its master switch device configuration with each of the slave switch device, which allows any of those slave switch devices to configure themselves as a master switch device in the event the switch device that is operating as the master switch device becomes unavailable. As such, switching fabrics may be configured and managed without the need for an external device with its own Central Processing Unit (CPU), and may instead be configured and managed using the CPU in the switch devices that are already being used to provide the switching fabric. Thus, the configuration of switching fabrics is provided in a manner that reduces the complexity, ongoing operational overhead, and relatively long times required for new system deployment, as well as eliminates the need for to provide a device external to the switching fabric that performs the management and control functionality for the switching fabric, thus reducing the cost of managing and controlling the switching fabric.

Figure 7:
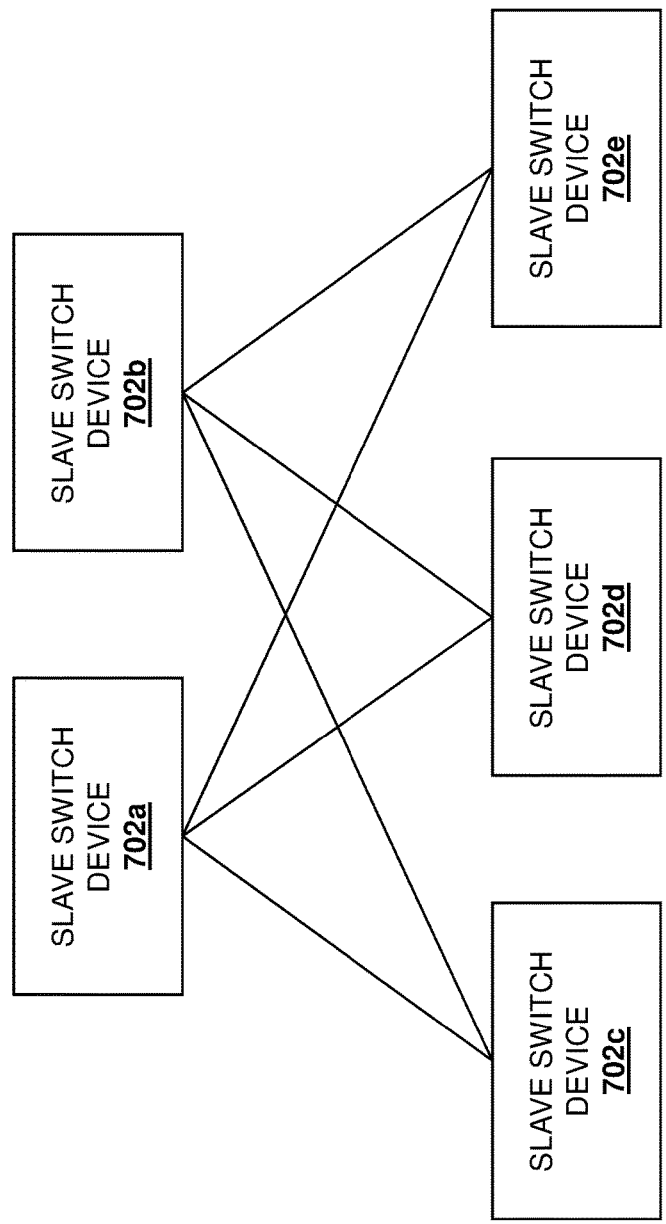
FIG. 7 is a schematic view illustrating an embodiment of a portion of the switching fabric configuration and management system of FIG. 6 providing an automatic switching fabric role determination system.

In some embodiments, the switching fabric configuration and management system 200 of the present disclosure allows for the performance of management and control operations on switch devices in the switching fabric 600 such as, for example, automated role determinations by the switch devices in the switching fabric 600. Referring now to FIG. 7, an embodiment of a portion of the switching fabric configuration and management system 200 of FIG. 6 is illustrated that may be utilized to provide an automatic switching fabric role determination system 700. In the illustrated embodiment, the automatic switching fabric role determination system 700 includes a plurality of slave switch devices 702*a*, 702*b*, 702*c*, 702*d*, and 702*e* that are coupled together (e.g., cabled together via cables (e.g., Ethernet cables) connected to ports on the slave switch devices 702*a-e*) and that may each have been configured to operate as the slave switch devices in the manner described above. As such, any or all of the slave switch devices 702*a-e* may be provided by the IHS 100 discussed above with reference to FIG. 1, and/or may include some or all of the components of the IHS 100. However, while a specific configuration of switch devices is illustrated in FIG. 7, one of skill in the art in possession of the present disclosure will recognize that a variety of switch device may be configured in a variety of manners to provide the automatic switching fabric role determination system of the present disclosure while remaining within its scope as well. For example, any of the slave switch devices 702*a-e* may be replaced by the master switch device 502*c* discussed above with reference to FIGS. 5 and 6, additional slave switch devices may be included in the automatic switching fabric role determination system 700, etc.

Figure 8:
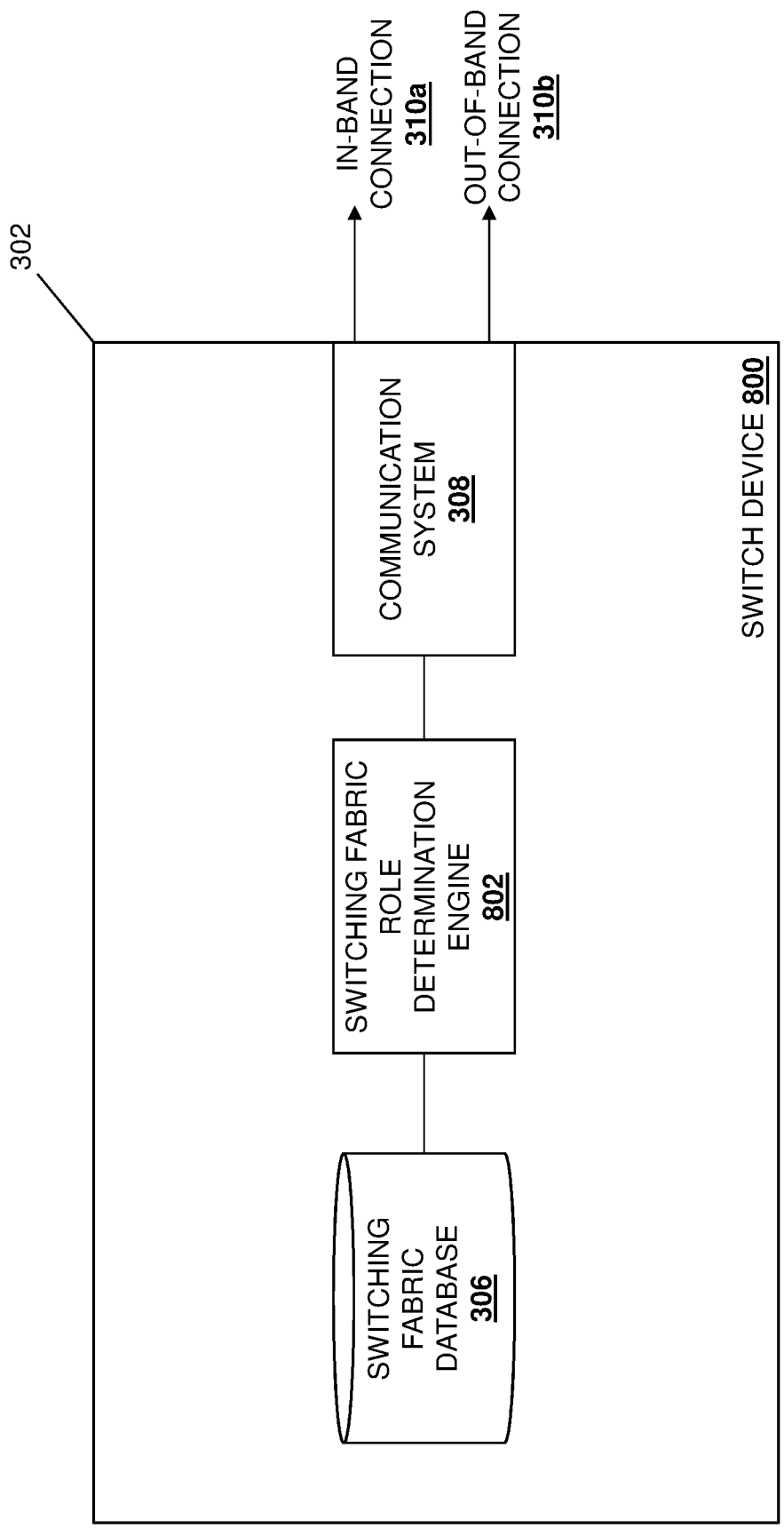
FIG. 8 is a schematic view illustrating an embodiment of the switch device of FIG. 3 that is configured to provide a switch device in the automatic switching fabric role determination system of FIG. 7.

Referring now to FIG. 8, an embodiment of a switch device 800 is illustrated that may provide any of the slave switch devices 702*a-e* discussed above with reference to FIG. 7, and that includes similar components as the switch device 300 discussed above with reference to FIG. 3. As such, elements numbers for similar components in the switch device 300 and the switch device 800 are provided with the same reference numbers. As discussed above, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switching fabric role determination engine 802 that is configured to perform the functionality of the switching fabric role determination engines and/or switch devices discussed below. In the specific example illustrated in FIG. 8, the switching fabric engine 304 in the switch device 300 has been replaced with the switching fabric role determination engine 802 in the switch device 800 that may be provided via the configuration of the switch device 300 as a slave switch device (or master switch device) in the manner discussed above. However, while a specific switch device has been illustrated and described, one of skill in the art in possession of the present disclosure will recognize that switch devices may include a variety of components and/or component configurations for performing the functionality discussed below while remaining within the scope of the present disclosure.

Figure 9:
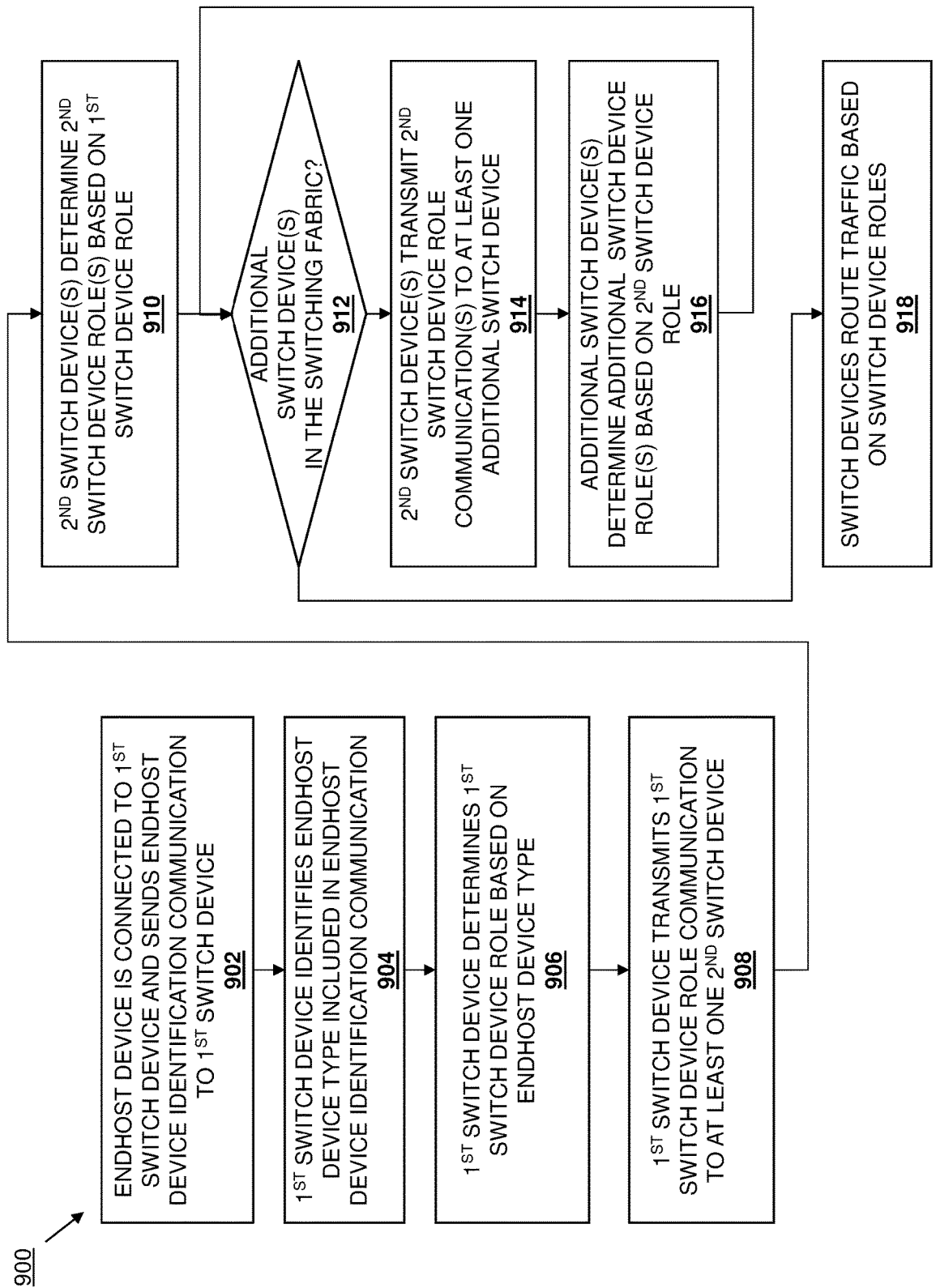
FIG. 9 is a flow chart illustrating an embodiment of a method for automatically assigning roles to switch devices in a switching fabric.

Referring now to FIG. 9, an embodiment of a method 900 for automatically determining roles in a switching fabric is illustrated. As discussed below, the systems and methods of the present disclosure may provide for the automatic determination of roles by switch devices in a switching fabric. In some examples, this is accomplished by a first switch device in the switching fabric receiving an endhost device identification communication from an endhost device following the connection of that endhost device to the first switch device, and identifying an endhost device type of the endhost device in that endhost device identification communication. The first switch device then determines a leaf switch device role for the first switch device based on the endhost device type, and transmits first switch device role communication(s) that identify the leaf switch device role to second switch device(s) in the switching fabric that are connected to the first switch device. When the second switch device(s) receive the first switch device role communication, they determine a spine switch device role for the second switch device(s) based on the leaf switch device role included in the first switch device role communication received from the first switch device. The second switch device(s) may then transmit second switch device role communication(s) that identify the spine switch device role to third switch device(s) in the switching fabric that are connected to the second switch device(s), which allows those third switch devices to determine their switch device roles, and so on until all of the switch device roles of all the switch devices in the switching fabric are determined.

Figure 10A:
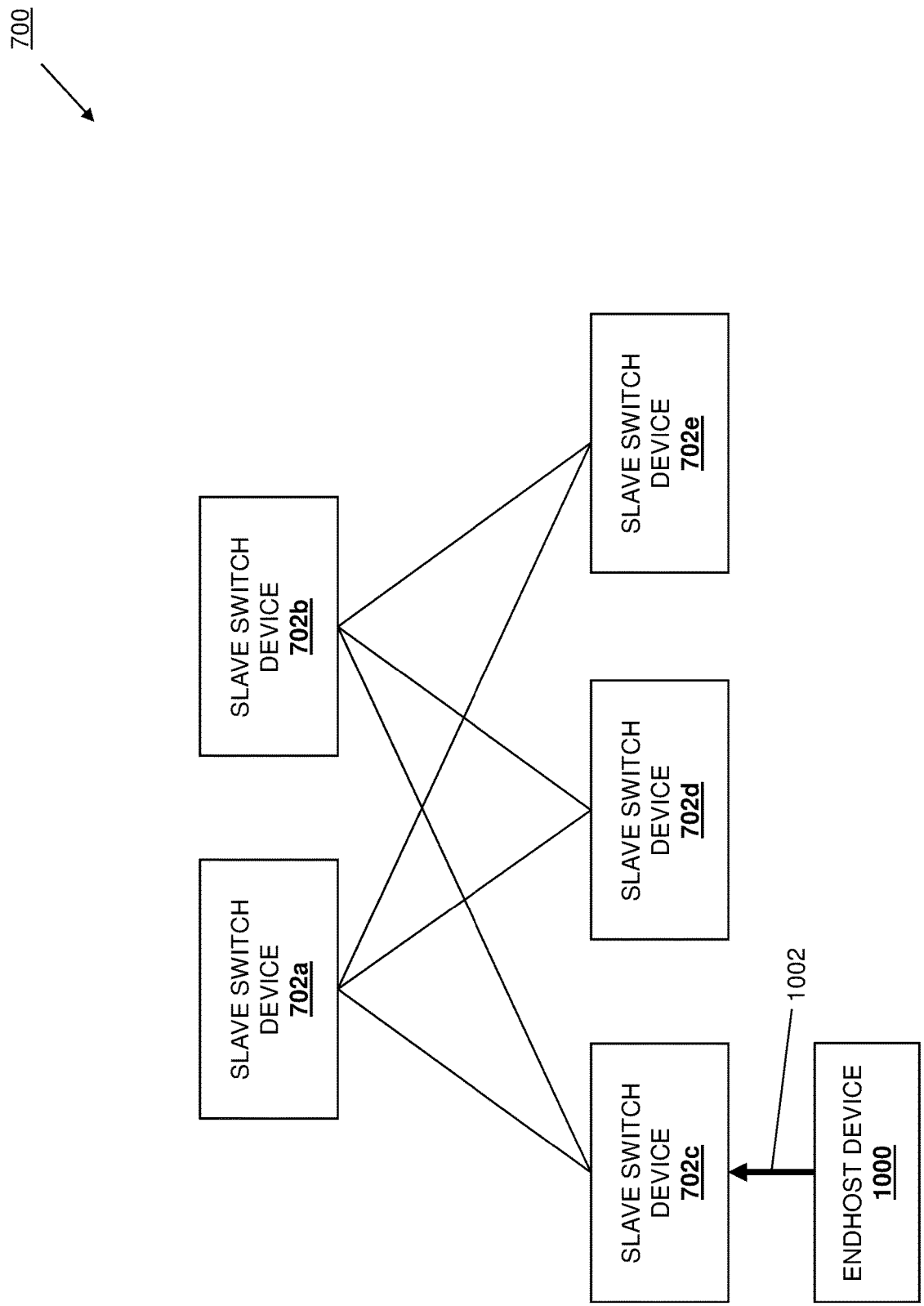
FIG. 10A is a schematic view illustrating an embodiment of communications in the automatic switching fabric role assignment system of FIG. 7 during the method of FIG. 9.

The method 900 begins at block 902 where an endhost device is connected to a first switch device and sends an endhost device identification communication to the first switch device. In an embodiment, at block 902, an endhost device such as, for example, a storage device, a server device, and/or other endhost devices known in the art, may be connected to one of the switch devices in the switching fabric 600. With reference to FIG. 10A, an endhost device 1000 is illustrated as connected to the slave switch device 702c, which may include connecting a cable (e.g., an Ethernet cable) to ports on the endhost device 1000 and the slave switch device 702c. Following the connection of the endhost device 1000 to the slave switch device 702c, the endhost device 1000 may generate an endhost device identification communication and transmit the endhost device identification communication to the slave switch device 702c, as illustrated by element 1002 in FIG. 10A. For example, following a power-on, reset, boot, and/or other initialization of the endhost device 1000, the endhost device 1000 may generate the endhost device identification communication as a Link Layer Discovery Protocol (LLDP) data packet that includes a Type-Length-Value (TLV) data structure, and store the endhost device type in that TLV data structure. In a specific example, the endhost device 1000 is a storage device, and a storage device type may be provided in the TLV data structure included in the LLDP packet (e.g., information may be included in TLV data structure that identifies that the storage device is an endhost provided by a particular type of storage device.) The endhost device 1000 may then transmit the LLDP data packet to the slave switch device 702a such that the switching fabric role determination engine 802 in the slave switch device 702c/800 receives that LLDP data packet via its communication system 308.

The method 900 then proceeds to block 904 where the first switch device identifies an endhost device type included in the endhost device identification communication. In an embodiment, at block 904, the switching fabric role determination engine 802 in the slave switch device 702c/800 identifies the endhost device type stored in the TLV data structure included in the LLDP data packet received from the endhost device 1000 at block 902. Continuing with the specific example provided above, the switching fabric role determination engine 802 in the slave switch device 702c/800 may use the endhost device type to identify that the device that has been connected to its communication system 308 is an endhost provided by a particular type of storage device. However, while a specific endhost device identifying itself utilizing a specific type of communication has been described, one of skill in the art in possession of the present disclosure will recognize that a variety of endhost devices (e.g., server devices, etc.) may be coupled to the switching fabric and may identify themselves in a variety of manners that will fall within the scope of the present disclosure as well.

The method 900 then proceeds to block 906 where the first switch device determines a first switch device role based on the endhost device type. In an embodiment, prior to the method 900, none of the slave switch devices 702a-e may have been assigned a switch device role. At block 906, the switching fabric role determination engine 802 in the slave switch device 702c/800 determines a first switch device role for the slave switch device 702c/800 based on the endhost device type that was identified in the TLV data structure included in the LLDP data packet received from the endhost device 1000 at block 902. For example, the switching fabric role determination engine 802 in the slave switch device 702c/800 may be configured to determine a leaf switch device role for any switch device that is directly connected to an endhost device or a spine switch device, to determine a spine switch device role for any switch device that is directly connected to a leaf switch device, and/or determine any other switch device role for a switch device based on the device role of another device that is directly connected to that switch device. As such, continuing with the example provided above, based on the identification that the device that was connected to its communication system 308 was an endhost provided by a particular type of storage device, the switching fabric role determination engine 802 in the slave switch device 702c/800 determines a leaf switch device role for the slave switch device 702c/800. However, while determinations of a few specific switch device roles based on the device roles of directly connected devices have been described, one of skill in the art in possession of the present disclosure will recognize that a variety of switch device roles may be determined based on a variety of device roles of directly connected devices while remaining within the scope of the present disclosure as well.

Figure 10B:
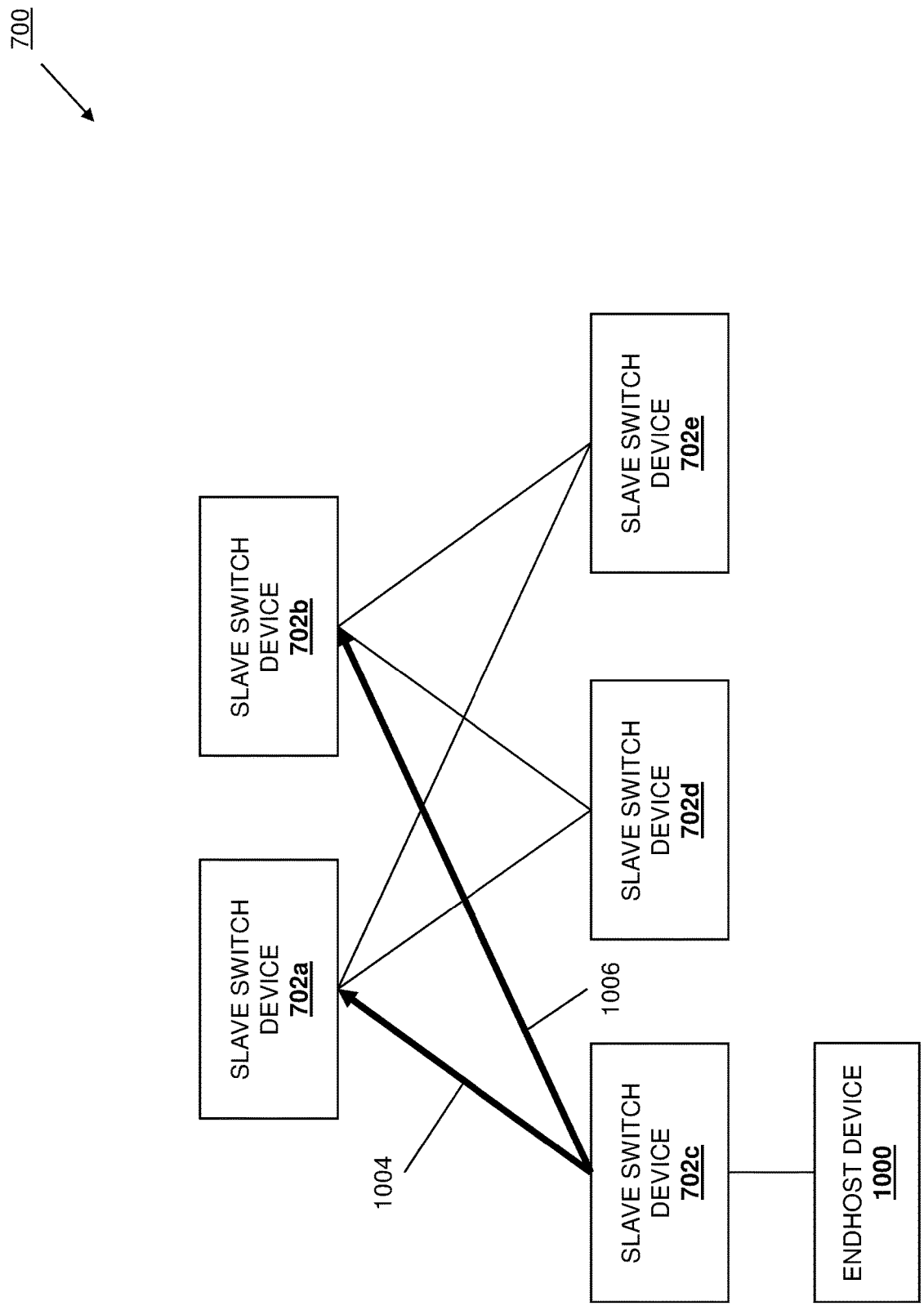
FIG. 10B is a schematic view illustrating an embodiment of communications in the automatic switching fabric role assignment system of FIG. 7 during the method of FIG. 9.

The method 900 then proceeds to block 908 where the first switch device transmits a first switch device role communication to at least one second switch device. In an embodiment, at block 908 and following the determination of the first switch device role for the slave switch device 702c/800, the switching fabric role determination engine 802 in the slave switch device 702c/800 may generate a first switch device role communication and transmit the first switch device role communication to the slave switch devices 702a and 702b, as illustrated by elements 1004 and 1006 in FIG. 10B. For example, following the determination of the first switch device role for the slave switch device 702*c*/800, the switching fabric role determination engine 802 in the slave switch device 702*c*/800 may generate the first switch device role communication that is provided by an LLDP data packet that includes a TLV data structure, and store the first switch device role in that TLV data structure. Continuing with the specific example discussed above, the slave switch device 702*c*/800 has determined a leaf switch device role for itself, and a leaf switch device role may be provided in the TLV data structure included in the LLDP packet (e.g., information may be included in TLV data structure that identifies that the slave switch device 702*c*/800 is an leaf switch device.) The switching fabric role determination engine 802 in the slave switch device 702*c*/800 may then transmit the LLDP data packets to the slave switch devices 702*a* and 702*b* such that the switching fabric role determination engine 802 in each of the slave switch devices 702*a*/800 and 702*b*/800 receives a respective LLDP data packet via its communication system 308.

The method 900 then proceeds to block 910 where the second switch device(s) determine second switch device role(s) based on the first switch device role. In an embodiment, at block 910, the switching fabric role determination engine 802 in each of the slave switch devices 702*a*/800 and 702*b*/800 determine respective second switch device roles for the slave switch devices 702*a*/800 and 702*b*/800, respectively, based on the first switch device role that was identified in the TLV data structure included in the respective LLDP data packet received from the slave switch device 702*c*/800 at block 908. Similarly as discussed above, the switching fabric role determination engine 802 in each of the slave switch devices 702*a*/800 and 702*b*/800 may be configured to determine a leaf switch device role for any switch device that is directly connected to an endhost device or a spine switch device, to determine a spine switch device role for any switch device that is directly connected to a leaf switch device, and/or determine any other role for a switch device based on the device role of another device that is directly connected to that switch device. As such, continuing with the example provided above, based on the identification of the slave switch device 702*c*/800 as a leaf switch device, the switching fabric role determination engine 802 in each of the slave switch devices 702*a*/800 and 702*b*/800 determines a respective spine switch device role for the slave switch devices 702*a*/800 and 702*b*/800, respectively. Similarly as discussed above, while determinations of a few specific switch device roles based on the device roles of directly connected devices have been described, one of skill in the art in possession of the present disclosure will recognize that a variety of switch device roles may be determined based on a variety of device roles of directly connected devices while remaining within the scope of the present disclosure as well.

Figure 10C:
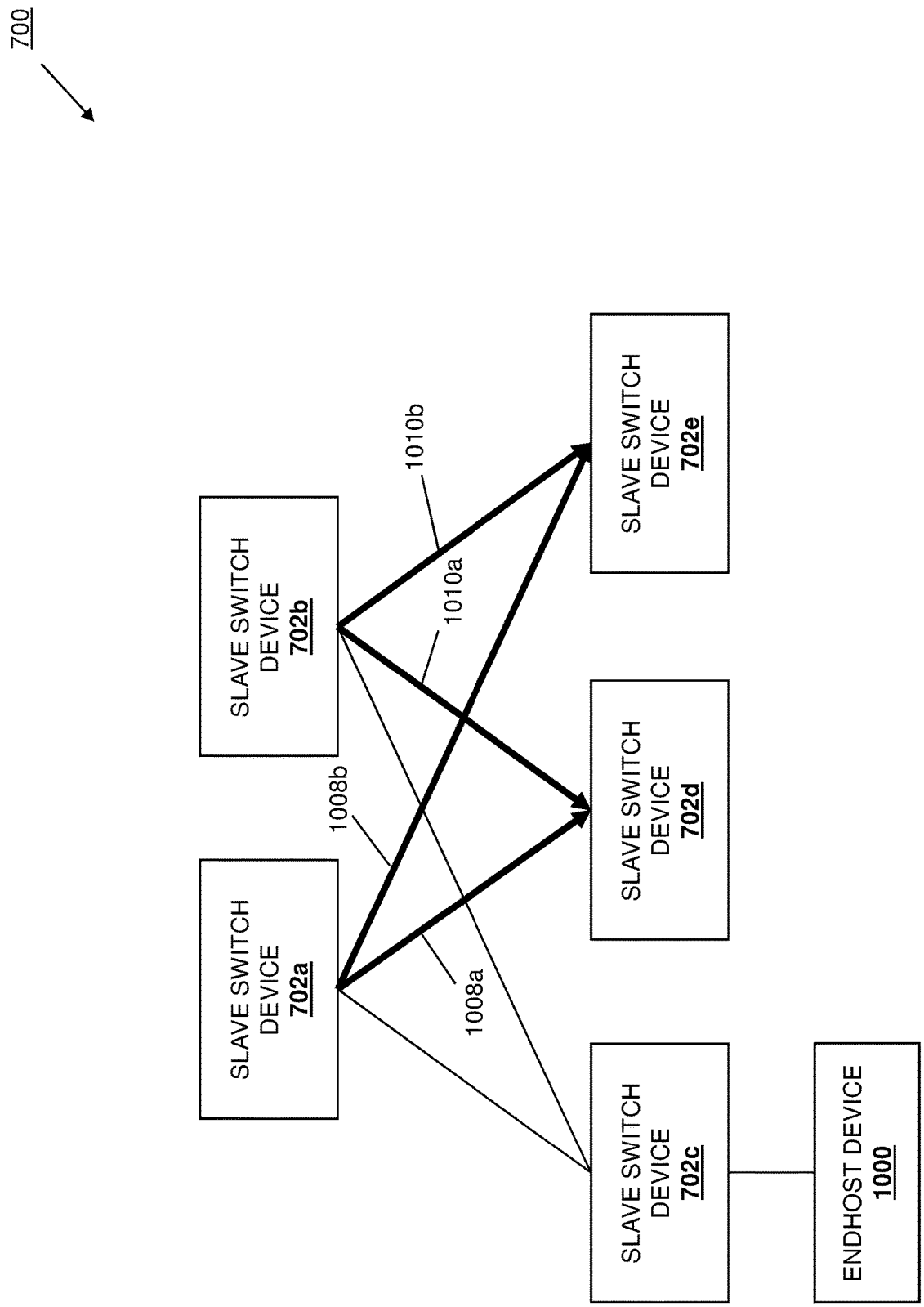

The method 900 then proceeds to decision block 912 where the method 900 may proceed differently depending on whether there are additional switch device(s) in the switching fabric. If, at decision block 912, there are additional switch device(s) in the switching fabric, the method 900 proceeds to block 914 where the second switch device(s) transmit second switch device role communication(s) to the additional switch device(s). In an embodiment, at block 914 and following the determination of the second switch device roles for the slave switch devices 702*a*/800 and 702*b*/800, the switching fabric role determination engine 802 in each of the slave switch devices 702*a*/800 and 702*b*/800 may each generate second switch device role communications, and transmit the second switch device role communications to the slave switch devices 702*d* and 702*e*, as illustrated by elements 1008*a*, 1008*b*, 1010*a*, and 1010*b* in FIG. 10C. For example, following the determination of the second switch device roles for the slave switch devices 702*a*/800 and 702*b*/800, the switching fabric role determination engine 802 in each of the slave switch devices 702*a*/800 and 702*b*/800 may generate the second switch device role communications that is provided by LLDP data packets that each include a TLV data structure, and store their second switch device role in the TLV data structure. Continuing with the specific example discussed above, the slave switch device 702*a*/800 has determined a spine switch device role for itself, and a spine switch device role may be provided in the TLV data structure of its LLDP data packet(s) (e.g., information may be included in the TLV data structure that identifies that the slave switch device 702*a*/800 is a spine switch device). Similarly, the slave switch device 702*b*/800 has determined a spine switch device role for itself, and a spine switch device role may be provided in the TLV data structure of its LLDP data packet(s) (e.g., information may be included in the TLV data structure that identifies that the slave switch device 702*a*/800 is a spine switch device.) The switching fabric role determination engine 802 in the slave switch devices 702*a*/800 and 702*b*/800 may then transmit their LLDP data packet(s) to the slave switch devices 702*d* and 702*e* such that the switching fabric role determination engine 802 in the slave switch devices 702*d*/800 and 702*e*/800 receive those LLDP data packets via their communication systems 308.

The method 900 then proceeds to block 916 where the additional switch device(s) determine additional switch device role(s) based on the second switch device role(s). In an embodiment, at block 916, the switching fabric role determination engine 802 in each of the slave switch devices 702*d*/800 and 702*e*/800 determine third switch device roles for the slave switch devices 702*d*/800 and 702*e*/800, respectively, based on the second switch device roles that were identified in the TLV data structure included in the LLDP data packets received from the slave switch devices 702*a*/800 and 702*b*/800 at block 908. Similarly as discussed above, the switching fabric role determination engine 802 in each of the slave switch devices 702*d*/800 and 702*e*/800 may be configured to determine a leaf switch device role for any switch device that is directly connected to an endhost device or a spine switch device, to determine a spine switch device role for any switch device that is directly connected to a leaf switch device, and/or determine any other role for a switch device based on the device role of another device that is directly connected to that switch device. As such, continuing with the example provided above, based on the identification of the slave switch devices 702*a*/800 and 702*b*/800 as spine switch devices, the switching fabric role determination engine 802 in each of the slave switch devices 702*d*/800 and 702*e*/800 determines a respective leaf switch device role for the slave switch devices 702*d*/800 and 702*e*/800, respectively. Similarly as discussed above, while determinations of a few specific switch device roles based on the device roles of directly connected devices have been described, one of skill in the art in possession of the present disclosure will recognize that a variety of switch device roles may be determined based on a variety of device roles of directly connected devices while remaining within the scope of the present disclosure as well The method 900 then returns to decision block 912. As such, decision block 912 and blocks 914 and 916 may loop until each of the switch devices in a switching fabric have determined their switch device roles. Thus, when there are not additional switch device(s) in the switching fabric (as in the example illustrated in FIGS. 7 and 10A-C), the method 900 proceeds to block 918 where the switch devices in the switching fabric route traffic based on their switch device roles. In an embodiment, at block 918, the slave switch devices 702*a* and 702*b* operate as spine switch devices (based on their spine switch devices roles determined at block 910 of the method 900), the slave switch device 702*c* operates as a leaf switch device (based on its leaf switch device role determined at block 906 of the method 900), and the slave switch devices 702*d* and 702*e* operate as leaf switch devices (based on their leaf switch devices roles determined at block 916 of the method 900), in order to route traffic to and from the endhost device 1000 (e.g., via other switch devices that are part of the switching fabric, other endhost devices that are connected to the switching fabric, and/or any other device that would be apparent to one of skill in the art in possession of the present disclosure), prevent loops in the switching fabric, and/or perform a variety of other switch device functionality that would be apparent to one of skill in the art in possession of the present disclosure.

Figure 11A:
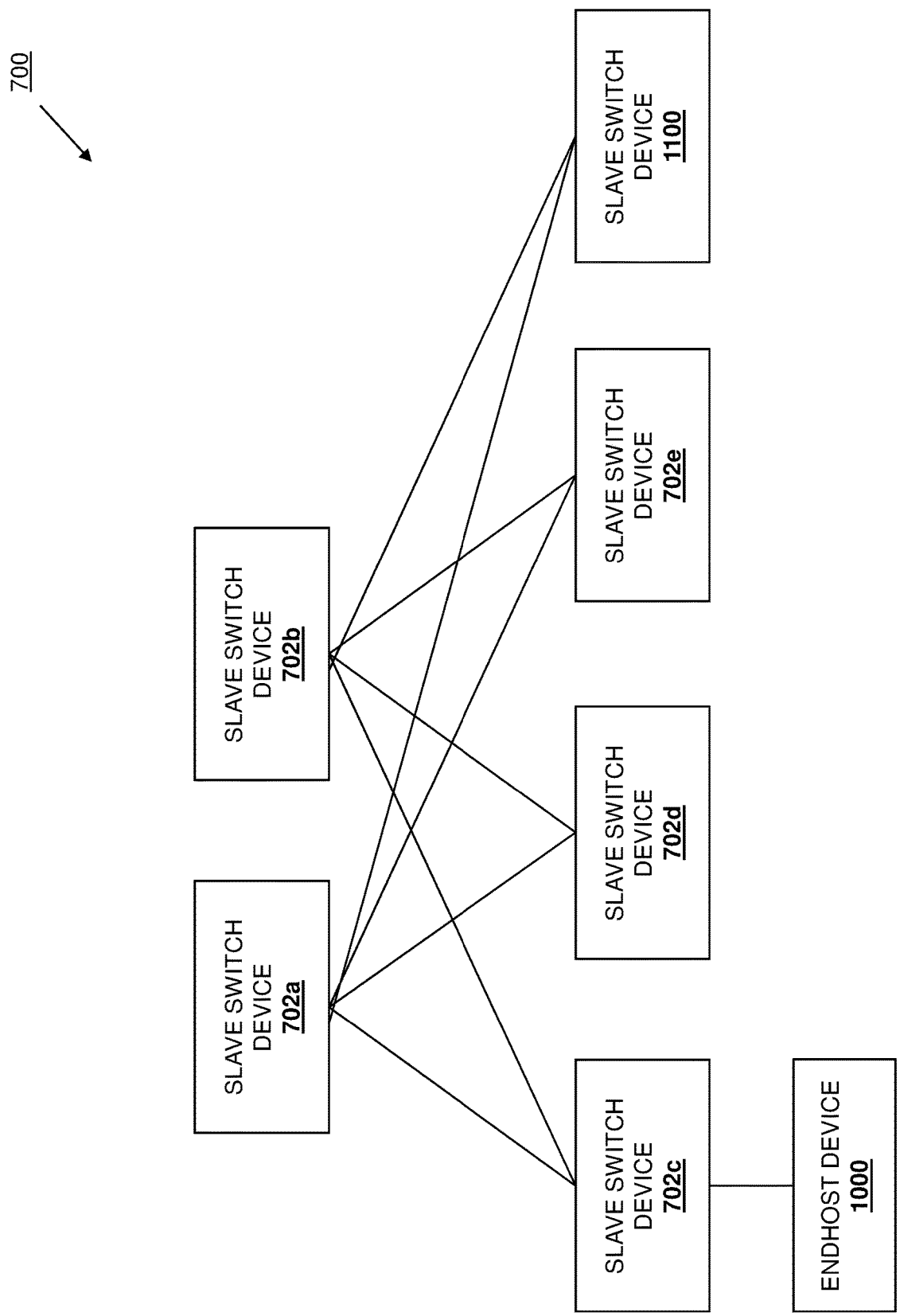
FIG. 11A is a schematic view illustrating an embodiment of the automatic switching fabric role assignment system of FIG. 100 with an additional switch device added.
Figure 11B:
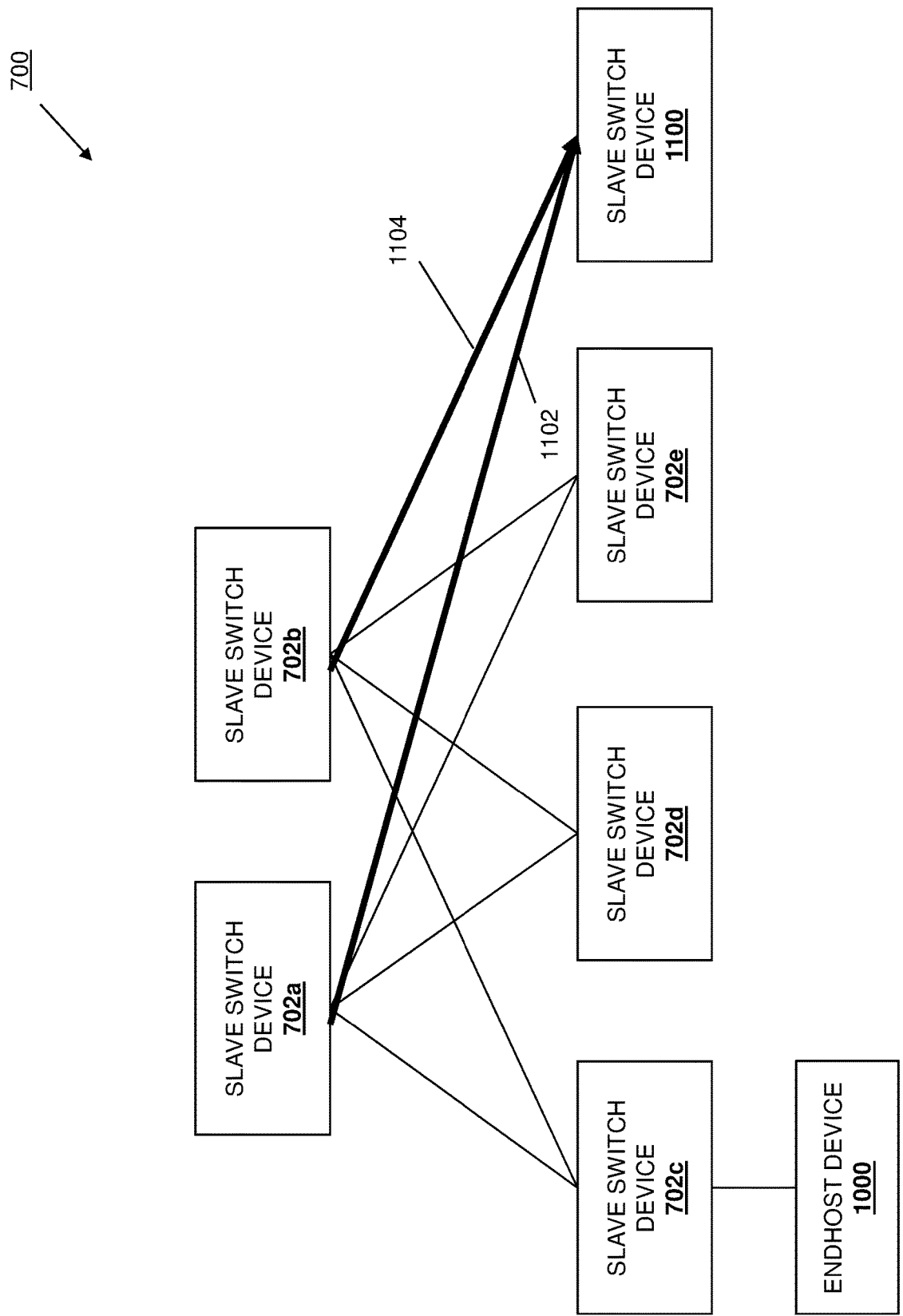
FIG. 11B is a schematic view illustrating an embodiment of communications in the automatic switching fabric role assignment system of FIG. 11A.

In some embodiments, following the method 900, switch devices may be added to the switching fabric, and may determine their switch device roles in substantially the same manner as discussed above during the method 900. For example, with reference to FIG. 11A, a slave switch device 1100 is illustrated as added to the switching fabric via its coupling to the slave switch device 702*a* and the slave switch device 702*b* (e.g., via cabling provided between respective ports on the slaves switch devices 702*a* and 702*b*, and the ports on the slave switch device 1100.) Following the powering on, resetting, booting, and/or other initialization of the switch device 1100, the switching fabric role determination engine 802 in each of the slave switch devices 702*a*/800 and 702*b*/800 may each generate second switch device role communications, and transmit the second switch device role communications to the slave switch device 1100, as illustrated by elements 1102 and 1004 in FIG. 11B. For example, the switching fabric role determination engine 802 in each of the slave switch devices 702*a*/800 and 702*b*/800 may generate the second switch device role communications that are provided by LLDP data packets that each include a TLV data structure, and store their second switch device role (e.g., the spine switch device role discussed above) in the TLV data structure. The switching fabric role determination engine 802 in the slave switch devices 702*a*/800 and 702*b*/ 800 may then transmit their LLDP data packet(s) to the slave switch device 1100 such that the switching fabric role determination engine 802 in the slave switch device 1100 receives those LLDP data packets via its communication systems 308.

The switching fabric role determination engine 802 in the slave switch device 1100 may then determine a fourth switch device role for the slave switch device 1100/800 based on the second switch device roles that were identified in the TLV data structure included in the LLDP data packets received from the slave switch devices 702*a*/800 and 702*b*/ 800. Similarly as discussed above, the switching fabric role determination engine 802 in the slave switch device 1100/ 800 may be configured to determine a leaf switch device role for any switch device that is directly connected to an endhost device or a spine switch device, to determine a spine switch device role for any switch device that is directly connected to a leaf switch device, and/or determine any other role for a switch device based on the device role of another device that is directly connected to that switch device. As such, continuing with the example provided above, based on the identification of the slave switch devices 702*a*/800 and 702*b*/800 as a spine switch devices, the switching fabric role determination engine 802 in the slave switch device 1100/ 800 determines a leaf switch device role for the slave switch device 1100/800. As such, switch devices added to the switching fabric may automatically determine their roles in a manner similar to the switch devices that are connected together in a switching fabric prior to any role assignment or determination.

Thus, systems and methods have been described that provide for the automatic determination of roles by switch devices in a switching fabric. For examples, switch devices may be connected together in a switching fabric, with none of those switch devices having been assigned a switch device role. When a first switch device in the switching fabric receives an endhost device identification communication from an endhost device following the direct connection of that endhost device to the first switch device, it identifies an endhost device type of the endhost device in that endhost device identification communication. The first switch device then determines a leaf switch device role for itself based on the determination that it is directly connected to an endhost device (i.e., based on the endhost device type), and transmits first switch device role communication(s) that identify the leaf switch device role to second switch device(s) in the switching fabric that are directly connected to the first switch device. When the second switch device(s) receive the first switch device role communication, they determine a spine switch device role for themselves based on the determination that they are each directly connected to a leaf switch device (i.e., based on the leaf switch device role). The second switch device(s) may then transmit second switch device role communication(s) that identify the spine switch device role to third switch device(s) in the switching fabric that are directly connected to the second switch device(s), which allows those third switch devices to determine their switch device roles, and so on until all of the switch device roles in the switching fabric are determined.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking fabric role assignment system, comprising:
an endhost device;
a plurality of networking devices that are coupled to each other, wherein a first networking device that is included in the plurality of networking devices is configured to:
identify a direct connection to the endhost device;
determine, based on the direct connection to the endhost device, a first networking device role for the first networking device; and
transmit a first networking device role communication that identifies the first networking device role; and
a second networking device that is included in the plurality of networking devices, connected to the first networking device, and configured to:
receive, from the first networking device, the first networking device role communication; and
determine, based on the first networking device role included in the first networking device role communication received from the first networking device, a second networking device role for the second networking device.

2. The system of claim 1, wherein the endhost device is a storage device, and wherein the first networking device role is a leaf networking device role that is determined based on the direct connection to the storage device.

3. The system of claim 1, wherein the first networking device determines a leaf networking device role as the first networking device role, and the second networking device determines a spine networking device role as the second networking device role based on the leaf networking device role for the first networking device.

4. The system of claim 1, wherein the second networking device is configured to transmit a second networking device role communication that identifies the second networking device role, and wherein the system further comprises:
a third networking device that is included in the plurality of networking devices, connected to the second networking device, and configured to:
receive, from the second networking device, the second networking device role communication; and
determine, based on the second networking device role included in the second networking device role communication received from the second networking device, a third networking device role for the third networking device.

5. The system of claim 4, wherein the first networking device determines a leaf networking device role as the first networking device role, the second networking device determines a spine networking device role as the second networking device role based on the leaf networking device role for the first networking device, and the third networking device determines a leaf networking device role as the third networking device role based on the spine networking device role for the second networking device.

6. The system of claim 1, wherein the first networking device role communication includes at least one Link Layer Discovery Protocol (LLDP) data packet having a Type-Length-Value (TLV) structure that stores the first networking device role.

7. An Information Handling System (IHS), comprising:
a processing system; and
a memory system that is coupled to the processing system and that includes instructions that, when executed by the processing system, cause the processing system to provide a networking fabric role determination engine that is configured to:
identify a direct connection to an endhost device;
determine, based on the direct connection to the endhost device, a first networking device role for the IHS; and
transmit, to a second networking device, a first networking device role communication that identifies the first networking device role and that is configured to cause the second networking device to determine a second networking device role for the second networking device.

8. The IHS of claim 7, wherein the endhost device is a storage device, and wherein the first networking device role is a leaf networking device role that is determined based on the direct connection to the storage device.

9. The IHS of claim 7, wherein the networking fabric role determination engine is configured to:
receive, from a networking device, a second networking device role communication; and
determine, based on a second networking device role included in the second networking device role communication received from the networking device, a third networking device role for the IHS.

10. The IHS of claim 9, wherein the second networking device role is a leaf networking device role for the networking device, and wherein the networking fabric role determination engine determines a spine networking device role as the third networking device role based on the leaf networking device role for the networking device.

11. The IHS of claim 9, wherein the second networking device role is a spine networking device role for the networking device, and wherein the networking fabric role determination engine determines a leaf networking device role as the third networking device role based on the spine networking device role for the networking device.

12. The IHS of claim 7, wherein the first networking device role communication includes at least one Link Layer Discovery Protocol (LLDP) data packet.

13. The IHS of claim 12, wherein the at least one LLDP data packet includes a Type-Length-Value (TLV) structure that stores the first networking device role.

14. A method for automatically determining roles in a networking fabric, comprising:
identifying, by a first networking device, a direct connection to an endhost device;
determining, by the first networking device based on the direct connection to the endhost device, a first networking device role for the first networking device; and
transmitting, by the first networking device to a second networking device, a first networking device role communication that identifies the first networking device role and that is configured to cause the second networking device to determine a second networking device role for the second networking device.

15. The method of claim 14, wherein the endhost device is a storage device, and wherein the first networking device role is a leaf switch device role that is determined based on the direct connection to the storage device.

16. The method of claim 14, further comprising:
receiving, by a second networking device that is connected to the first networking device, the first networking device role communication; and
determining, by the second networking device based on the first networking device role included in the first networking device role communication received from the first networking device, a second networking device role for the second networking device.

17. The method of claim 16, wherein the first networking device determines a leaf networking device role for the first networking device, and the second networking device determines a spine networking device role as the second networking device role based on the leaf networking device role for the first networking device.

18. The method of claim 14, further comprising:
receiving, by a second networking device in response to being connected to the first networking device, the first networking device role communication; and
determining, by the second networking device based on the first networking device role included in the first networking device role communication received from the first networking device, a second networking device role for the second networking device.

19. The method of claim 14, wherein the first networking device role communication includes at least one Link Layer Discovery Protocol (LLDP) data packet.

20. The method of claim 19, wherein the at least one LLDP data packet includes a Type-Length-Value (TLV) structure that stores the first networking device role.

* * * * *